US010484335B2

(12) United States Patent
Prodoehl et al.

(10) Patent No.: US 10,484,335 B2
(45) Date of Patent: Nov. 19, 2019

(54) SECURE REMOTE COMPUTER NETWORK

(71) Applicant: Connectify, Inc., Philadelphia, PA (US)

(72) Inventors: Brian Prodoehl, Philadelphia, PA (US); David Lewanda, Philadelphia, PA (US); Alex Gizis, Philadelphia, PA (US); Brian Lutz, Philadelphia, PA (US)

(73) Assignee: Connectify, Inc., Philadelphia, PA (US)

( * ) Notice: Subject to any disclaimer, the term of this patent is extended or adjusted under 35 U.S.C. 154(b) by 830 days.

(21) Appl. No.: 14/765,115

(22) PCT Filed: Feb. 11, 2013

(86) PCT No.: PCT/US2013/025559
§ 371 (c)(1),
(2) Date: Jul. 31, 2015

(87) PCT Pub. No.: WO2013/120069
PCT Pub. Date: Aug. 15, 2013

(65) Prior Publication Data
US 2016/0006695 A1 Jan. 7, 2016

Related U.S. Application Data

(60) Provisional application No. 61/596,883, filed on Feb. 9, 2012.

(51) Int. Cl.
H04L 29/06 (2006.01)
H04L 12/26 (2006.01)
(Continued)

(52) U.S. Cl.
CPC .......... *H04L 63/0272* (2013.01); *H04L 43/08* (2013.01); *H04L 45/20* (2013.01);
(Continued)

(58) Field of Classification Search
CPC ...... H04M 2207/35; H04M 2203/2044; H04L 63/0272; H04L 43/08; H04L 43/0876;
(Continued)

(56) References Cited

U.S. PATENT DOCUMENTS 5,969,632 A 10/1999 Diamant et al.
8,125,989 B2 2/2012 Kissel
(Continued)

OTHER PUBLICATIONS

ISHAC, Joseph, et al., On the Performance of TCP Spoofing in Satellite Networks, Military Communications Conference, 2001 (MILCOM, 2001), pp. 700-704, vol. 1, IEEE. http://www.icir.org/mallman/pubs/IA01/1A01.pdf.
(Continued)

Primary Examiner — Chirag R Patel

(57) ABSTRACT

Systems and methods to provide improved secure, high speed networking between two or more computers is disclosed. The invention provides a robust and flexible means to readily establish a secure connection between two or more computers using insecure public or private network connections, while eliminating most of the difficulties and issues a user typically experiences with varying virtual private networks ("VPN") and firewall configurations. The inventive system can be adapted to route traffic across multiple network connections based on a variety of criteria, including without limitation, the importance of any given data, the cost of each means of connection, and/or the performance of each possible means of connecting to the client system.

20 Claims, 7 Drawing Sheets

(51) Int. Cl.
    *H04L 29/12*      (2006.01)
    *H04L 12/733*      (2013.01)

(52) U.S. Cl.
    CPC ...... *H04L 61/1523* (2013.01); *H04L 63/0281* (2013.01); *H04L 63/08* (2013.01); *H04L 61/2514* (2013.01); *H04L 61/2592* (2013.01)

(58) Field of Classification Search
    CPC ............. H04L 12/4641; H04L 41/5009; G06F 2221/2107
    See application file for complete search history.

(56) References Cited

U.S. PATENT DOCUMENTS

| | | |
|---|---|---|
| 8,644,816 B2 | 2/2014 | Schmidtke et al. |
| 8,707,389 B2 | 4/2014 | Manku |
| 8,825,964 B1 | 9/2014 | Sopka et al. |
| 8,954,591 B2* | 2/2015 | Ganesan ............ H04L 41/5051 709/203 |
| 9,838,319 B2 | 12/2017 | Armstrong et al. |
| 2002/0023210 A1 | 2/2002 | Tuomenoksa et al. |
| 2002/0122228 A1 | 9/2002 | Rappaport et al. |
| 2003/0079018 A1* | 4/2003 | Lolayekar ................ G06F 3/06 709/226 |
| 2003/0140084 A1* | 7/2003 | D'Angelo ............... H04L 12/14 718/106 |
| 2004/0049702 A1 | 3/2004 | Subramaniam et al. |
| 2005/0180460 A1 | 8/2005 | Hirano et al. |
| 2007/0019619 A1 | 1/2007 | Foster et al. |
| 2008/0101460 A1 | 5/2008 | Rodriguez |
| 2008/0253282 A1 | 10/2008 | Kissel |
| 2009/0003384 A1 | 1/2009 | Rozental |
| 2009/0285175 A1 | 11/2009 | Nix |
| 2009/0322893 A1 | 12/2009 | Stallings et al. |
| 2010/0138909 A1* | 6/2010 | Chen .................... H04L 63/0209 726/11 |
| 2010/0145947 A1 | 6/2010 | Kolman et al. |
| 2011/0047583 A1 | 2/2011 | Howard et al. |
| 2011/0138458 A1* | 6/2011 | Kumar .................... H04L 63/18 726/15 |
| 2011/0258453 A1 | 10/2011 | Mansfield |
| 2011/0274264 A1* | 11/2011 | Zhang ............... H04M 3/42314 379/243 |

OTHER PUBLICATIONS

International Search Report and Written Opinion issued in related application PCT/US2013/025559 dated Apr. 23, 2013.

* cited by examiner

SECURE REMOTE COMPUTER NETWORK

CROSS-REFERENCE TO RELATED APPLICATIONS

This application is a U.S. National Phase of International Application No. PCT/US2013/025559 filed Feb. 11, 2013, which claims the benefit of priority to U.S. Patent Application No. 61/596,883 filed on Feb. 9, 2012, the contents of which are incorporated in this application by reference.

FIELD OF THE INVENTION

The present invention relates generally to the field of computer networks, and in more particularity, relates to secure, high speed networking between two or more computers using insecure public or private network connections. The secure, remote network provides for the configuration of an encrypted "tunnel" on a user's private network for data packets to pass through an insecure public network without risk of exposure.

BACKGROUND OF THE INVENTION

Computers can communicate with one another only when connected together using some form of a communications network. The internet is one such network, which has grown extensively over the past decade, and has the distinct advantage of being able to connect computers together from anywhere in the world. Another type of communications network is a local area networks ("LAN"), which are private networks that typically exist between only a few trusted computers, usually in an office or home. A further example of a computer communications network is a wide area network ("WAN"), which is usually used as a means of communications access to the internet via a wireless radio protocol.

There are many possible reasons to want remote computers to join a LAN. A LAN itself is often secure, it may contain or have access to important corporate resources at the office, or access to one's personal media or data files in a residential setting. However, once a user attaches to a LAN via a direct internet connection, the LAN is no longer secure. For this reasons, the Virtual Private Network ("VPN") was created. The VPN is software that appears to be another LAN adapter, but uses encryption technology and methods, and internet connections, to bridge remote computers onto a local area network, without risk of directly connecting the LAN to the public and insecure internet.

FIG. 1 illustrates a prior art classic Virtual Private Network 100. In such a network, predefined or rolling algorithms allow a secure connection between a computer 102 and a corporate server 116. This connection is made over any network 114, which may also be the internet, with security managed by the VPN layer on the client 108 and the server 118. Any software clients 104 on the client computer 102 will see the VPN layer 108 as a virtual network interface 106, appearing no different than the driver for a physical network interface 112. The VPN encapsulates all traffic sent to it as encrypted, private data, then sends it via a standard network interface and driver 110 to a physical network interface device 112, such as a Wi-Fi or Ethernet device.

The VPN data is secure over the unsecured network 114, using strong encryption. This type of encryption is superior to other standard forms of encryption, because even the structure of the data is hidden from any resource outside of the VPN. The classic VPN typically has pre-shared keys; an administrator will create encryption keys for each client computer 102, which are also known to the server 116. This prevents unauthorized users of the same VPN technology to connect, and it allows an administrator to de-authorize any given user. Some simple VPNs use only a single shared key for all connections.

The classic prior art VPN routes data to a server 116, which is also physically interfaced 112 to the external, insecure network 114. The server 116 communicates via an driver interface 110 to the server part of the VPN 118. It is only within this part of the system that the encrypted data is decrypted. In the classic VPN, the VPN server 118 is responsible for authenticating VPN clients 108. It will, of course, reply to said clients with encrypted packets, so the communication and traffic is encrypted in both signal directions and is two-way secure.

On the server 116, the VPN server 118 will also appear as a normal networking device to the server host operating system ("OS"), allowing access to the server's network software layer 110 and network software clients 104 within the server computer, and usually, out via a physical interface 112 to a secure corporate network 120.

The effect of the classic prior art VPN is that the remote client computer 104 behaves as if it is in the same building, connected to the secure corporate network 120, as the server 118 and other client computers 104. Yet, the data from the client 104 is secure, and the corporate network 120 is not subject to risk of attack via an open internet 114 or other insecure connection. A big disadvantage of a classic VPN is its complexity of use. A network administrator is usually needed, to hand out keys, to manage fire walls, etc. Moreover, it is dependent on the central authority for all VPN certifications. Even in a business scenario, managing a VPN and keeping it functional for all remote users can be a complex and problematic task.

In response to these type of issues, and to enable simpler VPNs for home users, a new kind of VPN management has become popular. This new VPN eliminates some or all aspects of a single central server, replacing it with a central manager for VPN certifications, which will let VPN clients rendezvous with one another, but then, at least to some extent, run peer-to-peer as long as the VPN is operating. FIG. 2 illustrates an example prior art embodiment of this modified VPN 200, which has enjoyed some success as a personal VPN. In this architecture, there is no corporate intranet, simply clients 102 that wish to merge their local networks together via a VPN.

This network architecture still enlists a management server 202, but in this instance the server is only for management purposes. A client 102 will establish a connection to a web or similarly accessible front end 204, which will allow it to define a VPN connection and other clients. The web front end 204 informs the VPN Manager of the connection, and it proceeds to direct the clients to establishing a peer-to-peer, authenticated VPN connection.

Some VPNs designed this way will continue to route some traffic through the VPN Manager 206, while others drop the management interface entirely and leave the clients to operate entirely peer-to-peer.

Another limitation of the typical VPN user is the network itself. Some client devices may have multiple internet connections: WAN, LAN, Wi-Fi, etc. But each of these connections are not necessarily useful at all times, particularly over the course of a day for a traveler. For example, while a Wi-Fi connection may be the best communication means at one location, a WAN may be better for signal transmission at a different location. It may be complex to switch the VPN from interface to interface, and there is usually no way to take advantage of the speed of multiple interfaces when they are available.

There is a history for using multiple physical interfaces and treating them as a single faster interface. This has historically been called "network bonding." The use of a bonded set of slower physical interfaces 112 to create one large, virtual interface is fairly well documented. FIG. 3 shows a typical prior art bonded network interconnect 300. In this system, there is a computer 102 with client applications 104 and a network interface layer 106 that needs to be connected to the internet or other fast network 114. However, it only has access to slow connections 304.

Using either a network layer or a device layer abstraction 302, such a system splits network traffic in some agreed-upon way over multiple point-to-point connections, such as phone lines, to a service provider 306. That service provider 306 contains a similar network layer or device layer 302, which can reassemble the traffic, delivering it to a standard network layer protocol 110, and ultimately, interfaced 112 to the target network 114. Examples of this type of architecture include the Integrate Services Digital Network ("ISDN") standard, and various systems for bonding analog phone modems such as Microsoft Modem Bonding, FatPipe, and others.

To improve upon this prior art, a number of additional features can be built into a VPN system. A more flexible means of establishing the VPN connection, with the option of using readily available public resources and standards is a tangible advancement. Using standards allows the user a choice between public or private resources for this connection. A further goal of the inventive system is an even greater simplification of the VPN setup, and taking the need for a proprietary central server out of the system as a further improvement. A further objection and advancement is to establish a novel means by which the VPN can route though firewalls that can often hinder VPN use in the field. And a final advancement allows dynamic use of any and all available interfaces, optimizing performance across all means of connection between two points on the VPN, and allowing rules to factor in the cost of any interface's use as well.

Based on the typical complexity of creating, establishing, and maintaining a VPN, there is plenty of room for improvement in this field. Specifically, a VPN can be created dynamically, without the need for expert configuration of the VPN, firewalls, routers, and other networking components. Coupling this with the ability to intelligently use all available bandwidth, and make the best of potentially faulty connections readily permits the ability to create a more ideal VPN for use by remote clients.

SUMMARY OF THE INVENTION

The primary elements of the secure remote computer network include means to configure an encrypted "tunnel" for data packets on a private network to pass through an insecure public network without risk of exposure. In preferred embodiments, the inventive systems and methods provide a robust and simple configuration mechanism, based on existing open standards for Internet "instant" messaging and media delivery that will remove the complexity and unreliability often associated with current VPNs.

More particularly, the present invention overcomes the disadvantages of the prior art and fulfills the needs described above by providing, in a preferred embodiment, a computer communications network system, comprising (a) at least one switchboard computer in a hub mode in communication connectivity with an external network; (b) at least one switchboard computer in a client mode in communication connectivity with an external network; and (c) a directory service in communication connectivity with an external network; wherein said at least one switchboard computer in a hub mode initiates a connection with said directory service to be registered and made available for said at least one switchboard computer in a client mode to dynamically communicate with said at least one switchboard computer in a hub mode through an external network.

Another embodiment of the present invention is a computer communications network system, comprising (a) at least one switchboard computer in a hub mode in communication connectivity with an external network, said at least one switchboard computer further comprising a discovery server to monitor external activity, a management data base to record current network communication statistics, a plurality of network address translators, a virtual network interface to communicate with a plurality of client computers, and a virtual private network to encrypt data prior to transmitting said encrypted data to one of said network address translators; (b) at least one switchboard computer in a client mode in communication connectivity with an external network, said at least one switchboard computer further comprising a discovery server to monitor external activity, a management data base to record current network communication statistics, a plurality of network address translators, a virtual network interface to communicate with a plurality of client computers, and a virtual switch and router in communication connectivity with a virtual private network to encrypt data prior to transmitting said encrypted data to one of said network address translators; and (c) a directory service in communication connectivity with an external network; wherein said at least one switchboard computer in a hub mode initiates a connection with said directory service to be registered and made available for said at least one switchboard computer in a client mode to communicate with said at least one switchboard computer in a hub mode through an external network.

Still another embodiment of the present invention is a method for creating a flexible and secure network connection between two or more computers, having at least one switchboard computer in a hub mode in communication connectivity with an external network; and at least one switchboard computer in a client mode in communication connectivity with an external network; and a directory service in communication connectivity with an external network; the method comprising the steps of (a) initiating from said at least one switchboard computer in a hub mode a connection with said directory service; and (b) registering said at least one switchboard computer in a hub mode a connection with said directory service as available for said at least one switchboard computer in a client mode to dynamically communicate with said at least one switchboard computer in a hub mode through an external network.

Other features and advantages of the present invention are provided in the following detailed description of the invention, which refers to the accompanying drawings.

DETAILED DESCRIPTION OF THE PREFERRED EMBODIMENTS

The present invention provides in various exemplary embodiments, methods and systems for transmitting data between two computer networks, using multiple, potentially insecure or unreliable connections to deliver the effect of unifying the two networks as one secure network. In addition, it provides an improved method of establishing a virtual private network over insecure or unreliable connections.

Figure 1:
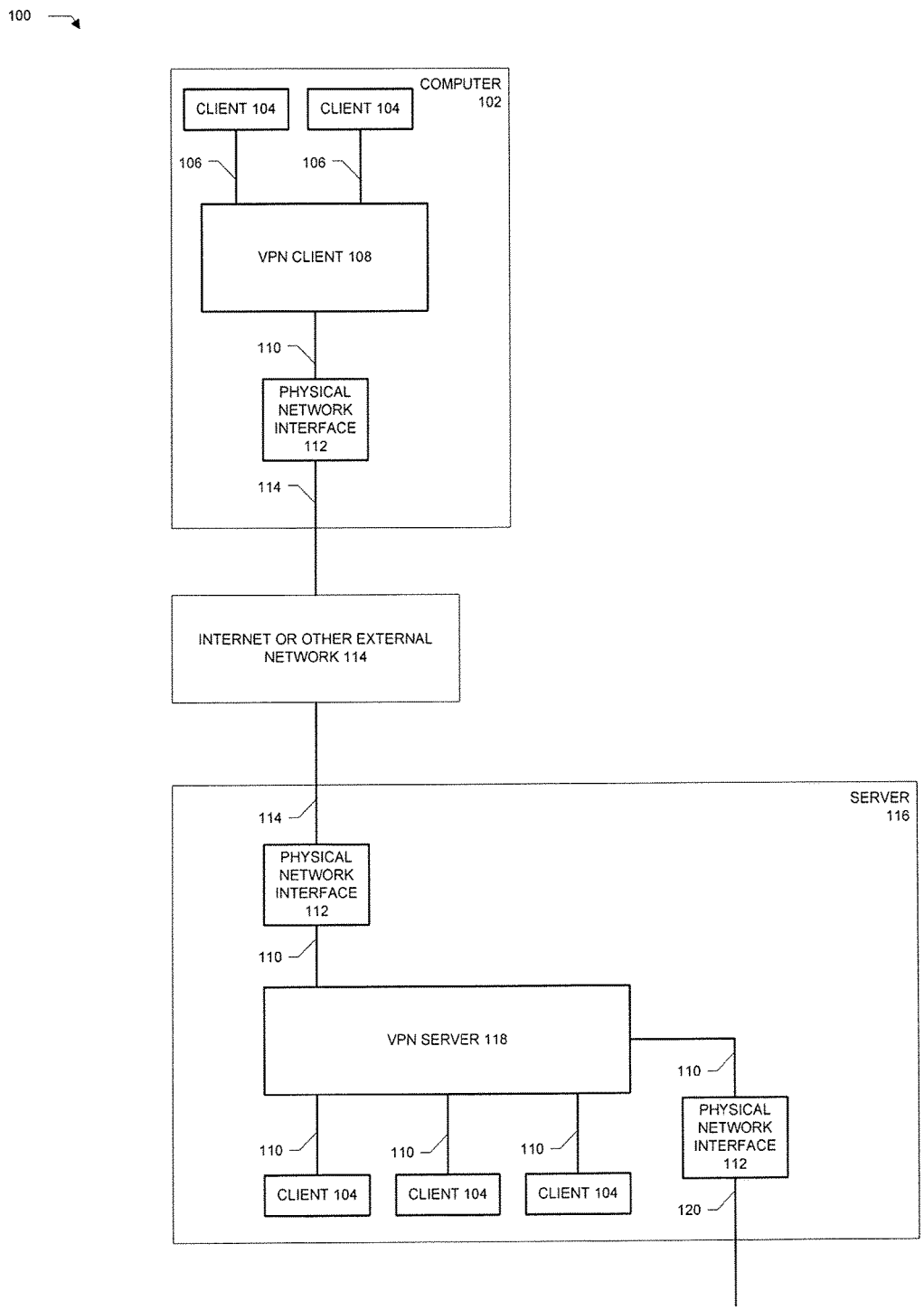
FIG. 1 illustrates an example prior art computer network architecture having a single VPN client and single VPN server.
Figure 2:
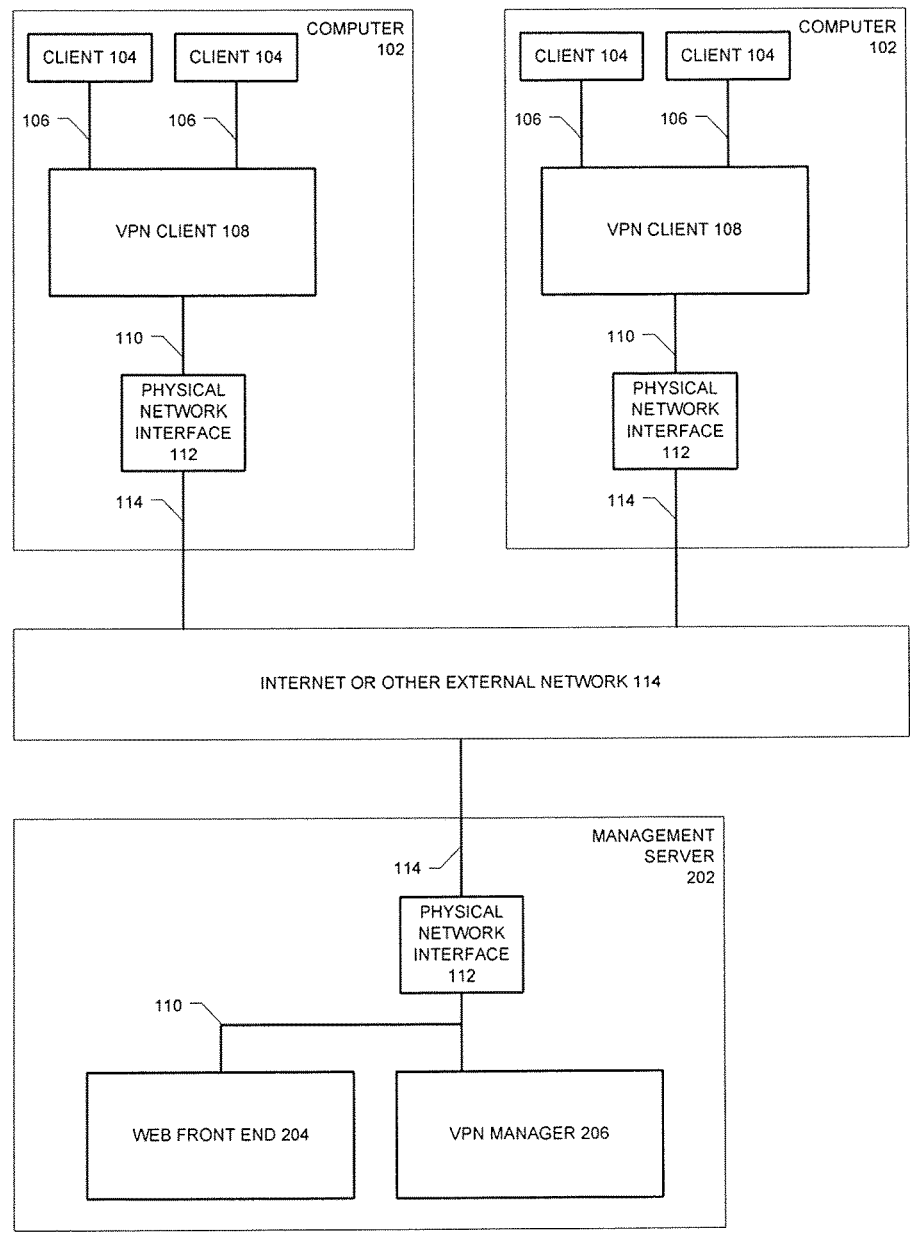
FIG. 2 illustrates an example prior art computer network architecture having more than one VPN client connected to a management server through the internet.
Figure 3:
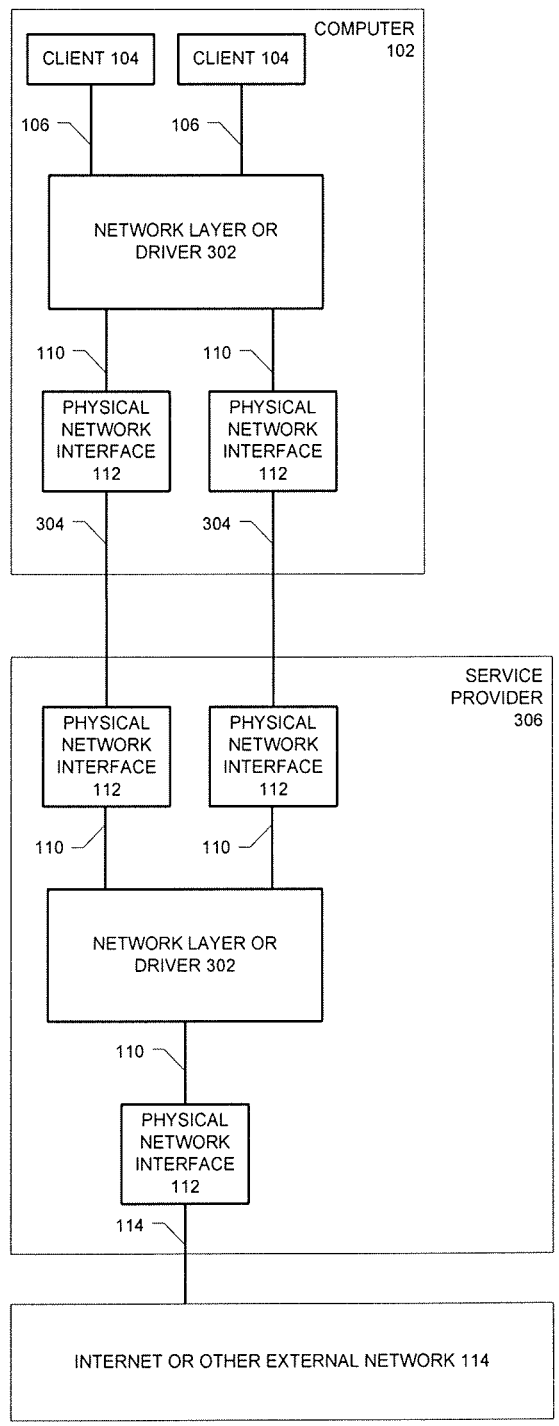
FIG. 3 illustrates an example prior art computer network architecture having a client computer connected to the internet through a service provider.
Figure 4:
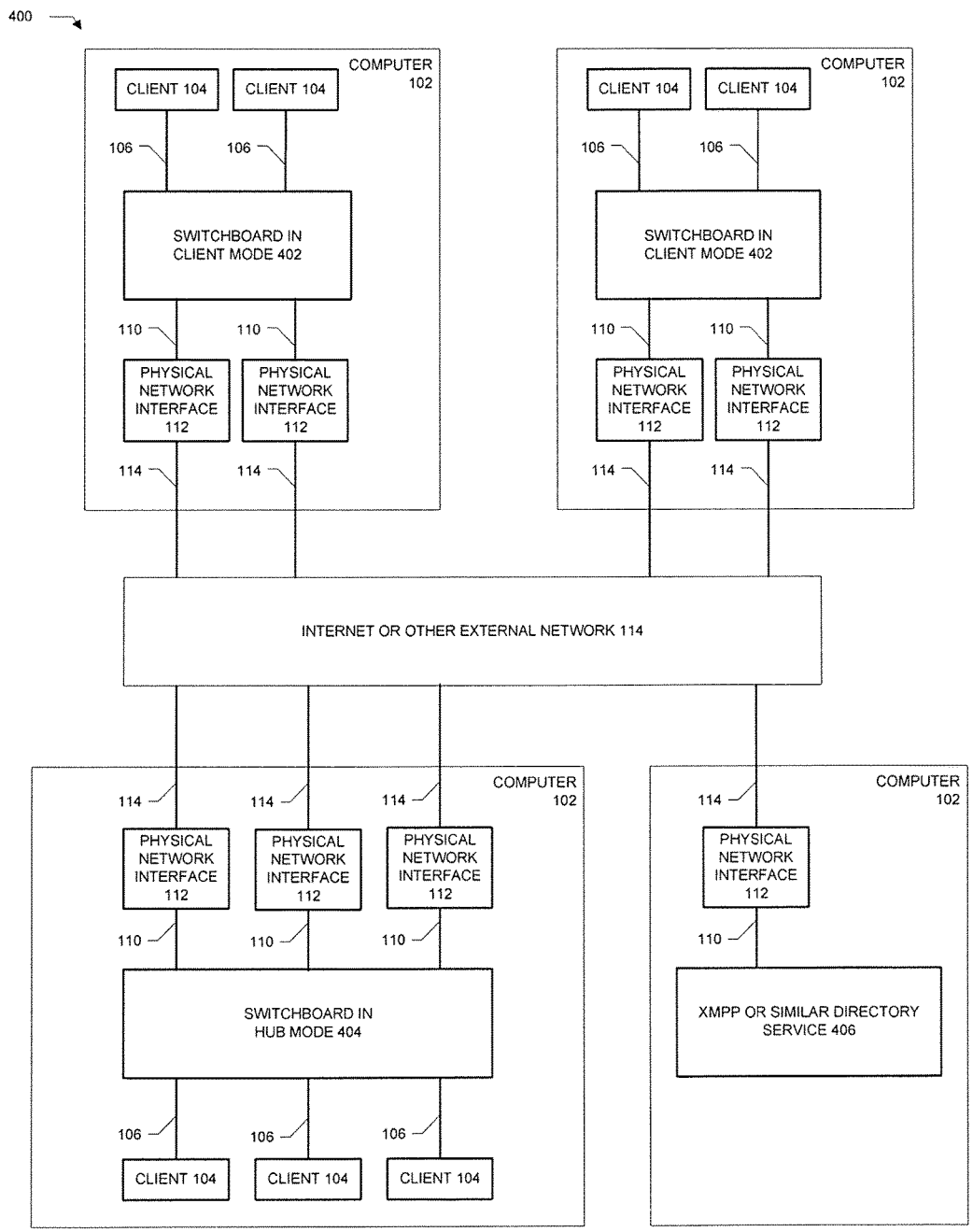
FIG. 4 illustrates the main components of a preferred embodiment of a "Switchboard" VPN network.

An exemplary embodiment of a switchboard network 400 system according to the present invention is illustrated in FIG. 4. The network consists of at least one switchboard in hub mode 404, one or more switchboards in client mode 402, and at least one an Extensible Messaging and Presence Protocol ("XMPP") or other similar directory service 406. The switchboard hub mode 404 is similar in some ways to a traditional VPN server, but more so it conceptually functions as a hub, similar to that in an Ethernet network. As such, the hub is not necessarily unique in a switchboard network, and there may be multiple hubs as well as multiple clients. The directory service can be an XMPP 406 or something similar in concept. The directory service can be completely private, hosted on a server appliance computer, or hosted on a public server such as Google Talk.

To describe the operation of an exemplary embodiment of the present inventive switchboard network, the computer 102 in hub mode 404 initiates making a connection to a directory service such as an XMPP 406, and registering that it (the computer 102 in hub mode 404) is available. The XMPP is an open protocol for real-time (e.g., instant) messaging over computer networks. The switchboard is well suited to using the XMPP protocols for directory-based discovery, but this is not the only possible service. Another similar service that might be used by the Switchboard is the Lightweight Directory Access Protocol ("LDAP"). Potential clients may then access that service based on other security protocols, as applicable, and request connection to the switchboard network 400, via any number of independent physical interfaces 112 connected to one or more external public or private networks, such as the internet 114.

Figure 5:
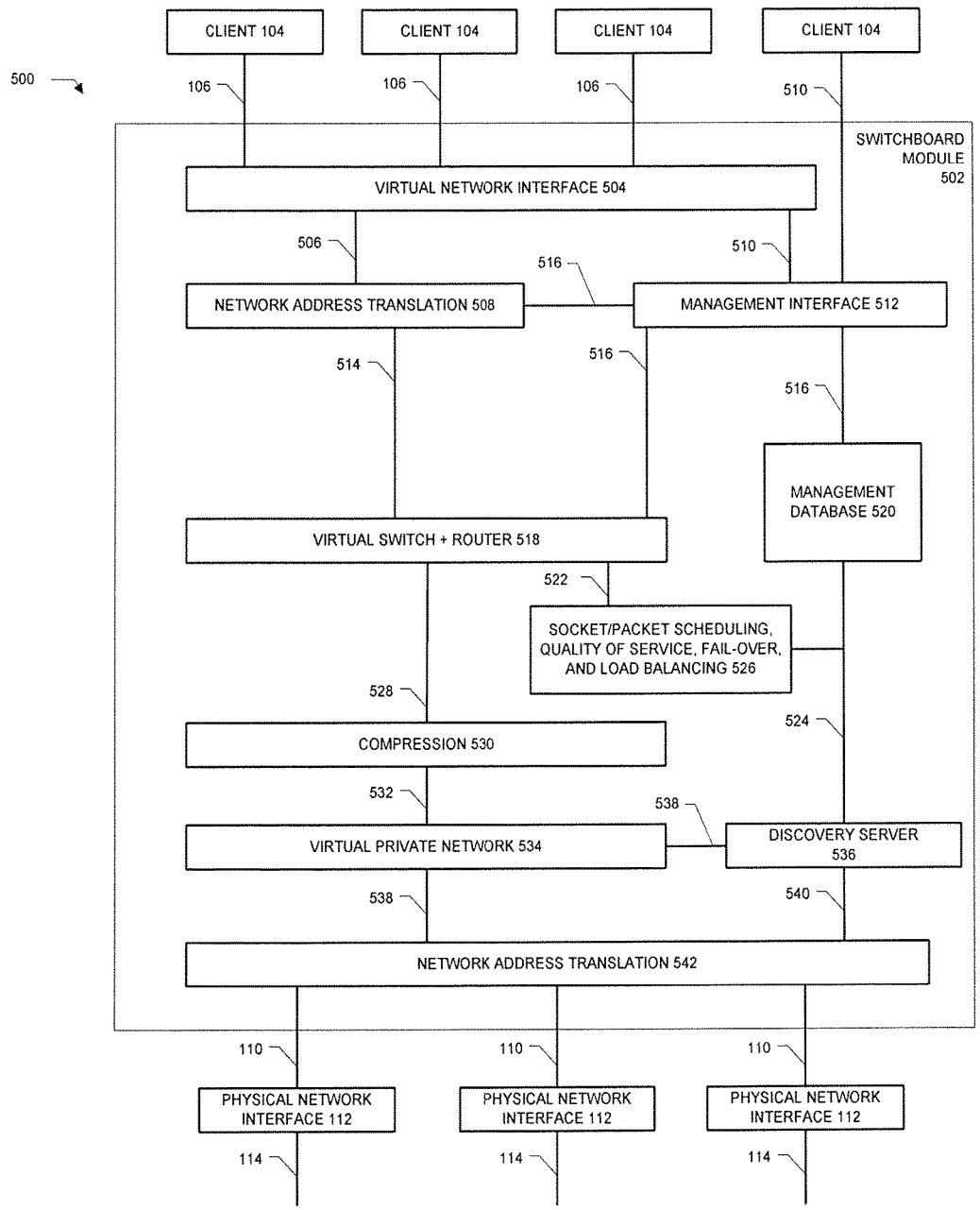
FIG. 5 illustrates the internal design of a preferred embodiment of the Switchboard module.

The detailed internals of an exemplary embodiment of the switchboard module 502 are shown in FIG. 5. The switchboard interface appears to a host computer as another Network Interface Card, via a virtual network interface 504 for the host operating system. A Management Interface process 512 is presented to adjust the behavior of the switchboard network, based on a local client 104 interface 510, such as an XML remote procedure call ("XML-RPC"). Behaviors are also modified by changes in the active system, discovery of clients or hubs via the Discovery Server 536, or statistics and other data, which is tracked in the Management Database 520.

The purpose of the Discovery Server 536 is to monitor external activity. The Discovery Server 536 will communicate with the centralized XMPP service 406, record changes to the clients 104 attached to a switchboard in server mode, and complete similar management functions.

The purpose of the Management Database 520 is to record current statistics and other information useful to the network. For example, the database 520 knows the cost, current performance, and expected reliability of every way of connecting between any two nodes in the network. Thus, as illustrated in FIG. 4, for a client 402 with two physical interfaces 112 connected to the Internet 114, communicating to a hub 404 with three physical interfaces 112 also connected to the Internet 114, the database 520 would track statistics on the six possible ways of establishing a connection between the client 402 and the hub 404.

The actual switchboard module 502 starts, as mentioned, with the virtual network interface 504. Traffic is routed 506 through a network address translation layer ("NAT") 508, which allows the host network address space to be independent of the internal routing decisions made by switchboard. The NAT 508 feeds 514 a virtual router/switch 518, which in the case of client mode will be bypassed. Data 524 from the Management Database 520 and the discovery server 536 inform the Socket Packet Scheduler 526. This Scheduler 526 takes into account quality of service, the number of active links between the hub and each client, the efficiency and cost of each link, and the global load on each hub link, to provide an optimal, packet by packet routing to each client over each available interface.

It is important to note that each physical link 114 to a client or hub is inherently dynamic. Interfaces may be added, removed, or simply go unreliable, and the switchboard system quickly adapts to any lost or added interfaces 112. So in a practical case, a laptop computer running a Switchboard client over Wi-Fi could be plugged into a gigabit Ethernet connection, and immediately boost the performance of on-going transactions. Or, a PC-Card or USB-based 3D modem could be added, and the laptop computer could then be taken mobile, again without disruption in on-going network transactions.

The output of the router 528 passes through an optional compression module 530. This layer will compress traffic 532 to the VPN 534 that will benefit from compression, and in the other signal direction, expand traffic 532 from the VPN 534 into the router. The VPN 534 itself applies encryption to each packet, then sends it down the appropriate Internet Protocol tunnel 538 to another Network Address Translator 542. This second NAT translates the VPN packet addresses to match the network conventions of the physical network interfaces 112. VPN packets are then sent 110 to the appropriate NICs 112, and then on to each respective network 114.

A packet being received by a hub 404 or client 402 follows this path in reverse. The external network 114 delivers a packet to one or more of the physical interfaces 112. These are VPN packets, which contain the encrypted private network packets. These run through a NAT 542 and on to the VPN 534 manager. This layer will dismantle the VPN, decrypt the payload, and collect complete data packets. These are then sent on 532 to the compression module 530 and decompressed if possible.

If operating in a hub mode node, the packet is sent 528 to the router module 518, and perhaps sent back out to another client node, depending on the routing information for that node. Again, this is optimized in the packet scheduler 526, by analysis of the performance for all possible links, the quality of service for the particular packet, reliability of each outgoing link, and load balancing of all traffic across the hub.

When the switchboard module is in client mode, the router 518 is bypassed and the packet is sent directly to the local side NAT 508. Similarly, if this is a packet destined for the hub's local network, the router directs it on 514 to the local side NAT 508. Network addresses are rationalized here for the local network 106, and eventually get routed to local client programs, or possibly back to the internet via a hub firewall.

Figure 6A:
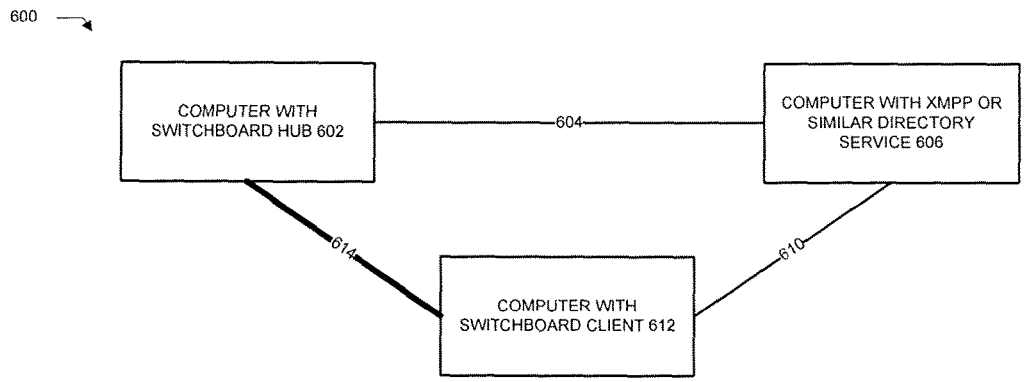
FIG. 6A illustrates a preferred embodiment of one mode of client to hub connection via the XMPP or other directory protocol.
Figure 6B:
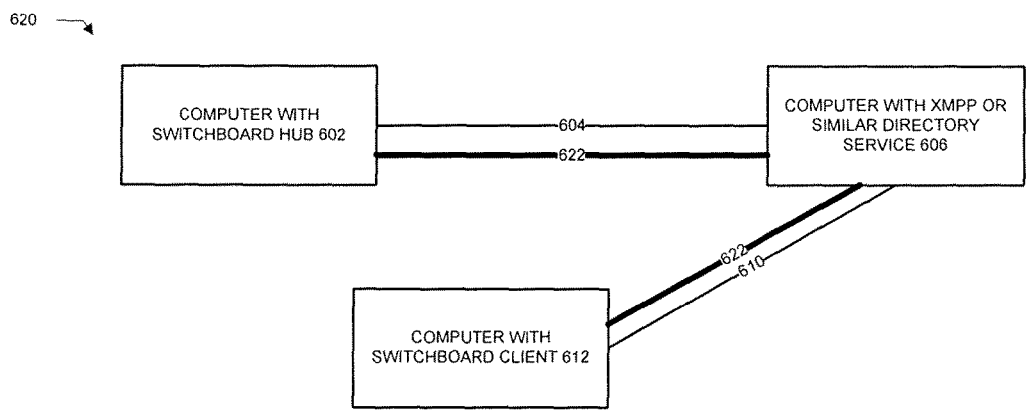
FIG. 6B illustrates another preferred embodiment of another mode of client to hub connection via the XMPP or other directory protocol through a two-hop network.

FIG. 6A and FIG. 6B illustrate some aspects of the discovery server 536 described above. As shown in FIG. 6A, a peer-to-peer 600 network may be established between any two of the multiple connections possible on switchboard enabled devices. The hub 602 registers 604 with an XMPP service 606, which can be public or private. The client 612 will, at a later time, contact the XMPP or other directory service 606 and ask for a connection to the switchboard hub 602. These are general purpose protocols inherent in XMPP. In other words, the XMPP service 606 knows nothing specific about the network being established by the switchboard.

In the case of XMPP, the XMPP service 606 will interrogate the client 612 and hub 602, and attempts to establish a peer-to-peer link 614 between the two computers. This uses the Jingle protocol, which is intended to encapsulate multimedia data between two systems. Since the Jingle protocol itself does not care about specific contents, the switchboard is taking advantage of this mechanism for real-time streaming to make the VPN connection 614 without the usual complexity of setup.

Jingle connections are set up via the open Interactive Connectivity Establishment ("ICE") methodology, which can usually manage the complexities of NAT traversal, and thus create the peer-to-peer connection 614 shown in FIG. 6A. But when ICE cannot establish the connection, the XMPP service 606 can act as an intermediary, creating a two-hop network 620, as shown in FIG. 6B. Based on the fact that the client 612 and hub 602 have connected to the XMPP service, the ICE protocols can manage a hop 622 through the XMPP service 606, because the XMPP service 606 device can be seen by, or be communicating with, both the client 612 and hub 602.

It is important to note that the Jingle protocol establishes rapid transport protocol ("RTP") connections, which are ideal for media streaming, not Transmission Control Protocol/Internet Protocol ("TCP/IP") connections. TCP/IP connections are normally desired for 2-way data communications, where every data packet sent is acknowledged as received. Such acknowledgement of receipt is not undertaken with RTP connections. This would normally be a problem for a data link such as the switchboard VPN. However, the Switchboard VPN is already managing the possibility of faulty links, and is doing so at a high level. As such, this equates to being an advantage to the switchboard protocol.

The TCP/IP protocol works great for a reliable or mostly reliable connection. But as packet failures increase, a network can get swamped by retry packets. Moving the management of these problems to a higher, multi-network view in a switchboard, more intelligent decisions can be made about lost packets. Such lost packets could get routed via a different network connection. For example, a lower priority connection might receive a request for multiple missing packets, for transmission efficiency. Similarly, a critical channel that has not yet failed may be moved to a more reliable connection, lowering the traffic burden on the failing connection. In short, the media-friendly connection is actually an advantage for switchboard's means of implementing the VPN.

Figure 7:
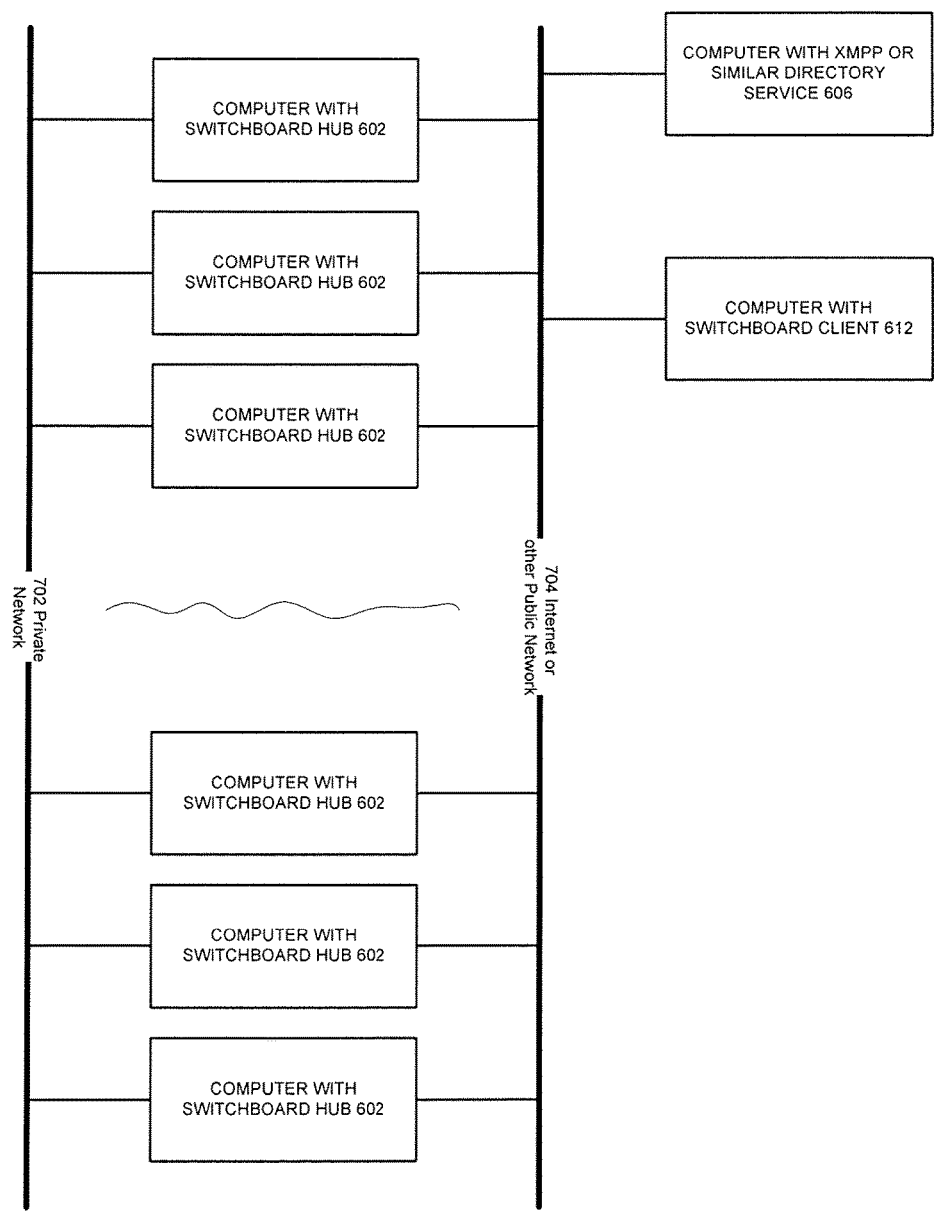
FIG. 7 illustrates an exemplary embodiment of a large private network with multiple hub access points.

A final aspect of the invention is, as mentioned, the non-uniqueness of the hub, versus a server in some prior VPN systems. As shown in FIG. 7, the switchboard architecture can be readily scaled up to very larger networks. A large private network 702 may have many different points of access, via switchboard hubs 602, to a public network such as the internet 704. A switchboard client 612 may accordingly gain access to the private network via any hub 602.

In such a network, the directory service 606 will automate the optimization of this connection. The directory 606 itself is periodically updated with statistical information about each hub it lists, including performance and load statistics. The client 612, when engaged with the directory service 606 in the discovery process, will be able to select an optimal hub 602, based on the load of the hub 602 and the cost and performance of connection between client 612 and hub 602.

As described above, the inventive system and methods are able to improve the performance of the VPN connection. This is in part resulting from the ability of the computer network to dynamically schedule virtual network traffic over any and/or all available network interfaces, on a packet-by-packet basis. Moreover, in preferred embodiments, the inventive computer network is capable of monitoring its own performance, and using point-to-point performance of each system-to-system path, monitor overall load of the entire VPN, as well as cost and reliability of each connection, and priority of each socket connection to automatically create optimized networks that can significantly improve performance, cost, and reliability of the VPN connections.

While the present invention is described herein with reference to illustrative embodiments for particular data communication applications, it should be understood that the invention is not limited to those embodiments described. Those having ordinary skill in the art and access to the teachings provided herein will recognize additional applications and embodiments, further modifications, and certain substitution of equivalents, all of which are understood to be within the scope of the claimed invention. Accordingly, the invention is not to be considered as limited by the foregoing description.

What we claim is:

1. A computer communications network system, comprising:
   (a) at least one VPN server computer in a hub mode in communication connectivity with an external network;
   (b) at least one VPN client computer in a client mode in communication connectivity with an external network;
   (c) a directory service in communication connectivity with an external network, the directory service enabling open protocol real-time messaging; and
   (d) a management database for recording real time statistics related to the computer communications network system, the real time statistics including (i) cost, (ii) performance, and (iii) expected reliability of each of a plurality of potential connections between the at least one VPN server computer in a hub mode and the at least one VPN client computer in a client mode,
   wherein said at least one VPN server computer in a hub mode initiates a connection with said directory service to be registered and made available for said at least one VPN client computer in a client mode to dynamically communicate via the open protocol real-time messaging with said at least one VPN server computer in a hub mode through an external network.

2. The computer communications network system, as described in claim 1, wherein the external network is a global communications network.

3. The computer communications network system, as described in claim 1, wherein the external network is the internet.

4. The computer communications network system, as described in claim 1, wherein the directory service is an Extensible Messaging and Presence Protocol ("XMPP").

5. The computer communications network system, as described in claim 1, wherein the directory service is a Lightweight Directory Access Protocol.

6. The computer communications network system, as described in claim 1, wherein the directory service is hosted on a server appliance computer.

7. The computer communications network system, as described in claim 1, wherein the directory service is hosted on a public server.

8. The computer communications network system, as described in claim 1, which uses the XMPP-related Jingle protocol to exchange data packets between the at least one VPN client computer in a client mode, and the at least one VPN server computer in a hub mode.

9. A computer communications network system, comprising:
    (a) at least one VPN server computer in a hub mode in communication connectivity with an external network, said at least one VPN server computer in a hub mode further comprising a discovery server to monitor external activity, a management data base to record current network communication statistics, a plurality of network address translators, a virtual network interface to communicate with a plurality of client computers, and a virtual private network to encrypt data prior to transmitting said encrypted data to one of said network address translators;
    (b) at least one VPN client computer in a client mode in communication connectivity with an external network, said at least one VPN client computer in a client mode further comprising a discovery server to monitor external activity, a management data base to record current network communication statistics, a plurality of network address translators, a virtual network interface to communicate with a plurality of client computers, and a virtual switch and router in communication connectivity with a virtual private network to encrypt data prior to transmitting said encrypted data to one of said network address translators;
    (c) a directory service in communication connectivity with an external network, the directory service enabling open protocol real-time messaging; and
    (d) a management database for recording real time statistics related to the computer communications network system, the real time statistics including (i) cost, (ii) performance, and (iii) expected reliability of each of a plurality of potential connections between the at least one VPN server computer in a hub mode and the at least one VPN client computer in a client mode,
    wherein said at least one VPN server computer in a hub mode initiates a connection with said directory service to be registered and made available for said at least one switchboard computer in a client mode to communicate via the open protocol real-time messaging with said at least one VPN server computer in a hub mode through an external network.

10. The computer communications network system, as described in claim 9, which uses the XMPP-related Jingle protocol to exchange data packets between the at least one VPN client computer in a client mode, and the at least one VPN server computer in a hub mode.

11. The computer communications network system, as described in claim 9, wherein the external network is a global communications network.

12. A virtual private network for computer communications, comprising:
    (a) at least one VPN server computer in a hub mode in communication connectivity with an external network;
    (b) at least one VPN client computer in a client mode in communication connectivity with an external network;
    (c) a directory service in communication connectivity with an external network, the directory service enabling open protocol real-time messaging; and
    (d) a management database for recording real time statistics related to the virtual private network, the real time statistics including (i) cost, (ii) performance, and (iii) expected reliability of each of a plurality of potential connections between the at least one VPN server computer in a hub mode and the at least one VPN client computer in a client mode,
    wherein said at least one VPN server computer in a hub mode initiates a connection with said directory service to be registered and made available for said at least one VPN client computer in a client mode to dynamically communicate via the open protocol real-time messaging with said at least one VPN server computer in a hub mode through an external network.

13. The virtual private network for computer communications, as described in claim 12, wherein said directory service is an XMPP and uses at least one Interactive Connectivity Establishment protocol to establish the connection between the at least one VPN server computer in a hub mode, and the at least one VPN client computer in a client mode.

14. The virtual private network for computer communications, as described in claim 12, wherein said directory service is an XMPP and creates a connection between the at least one VPN server computer in a hub mode, and the at least one VPN client computer in a client mode, using the XMPP service as a two-hop relay point.

15. The virtual private network for computer communications, as described in claim 12, which uses the XMPP-related Jingle protocol to exchange data packets between the at least one VPN client computer in a client mode, and the at least one VPN server computer in a hub mode.

16. The virtual private network for computer communications, as described in claim 12, further comprising protocols that allow said at least one VPN client computer in a client mode to select an optimal access hub from a plurality of access hubs.

17. A method for creating a flexible and secure network connection between two or more computers, having at least one VPN server computer in a hub mode in communication connectivity with an external network; and at least one VPN client computer in a client mode in communication connectivity with an external network; a directory service in communication connectivity with an external network, the directory service enabling open protocol real-time messaging; and a management database for recording real time statistics related to the flexible and secure network connection, the real time statistics including (i) cost, (ii) performance, and (iii) expected reliability of each of a plurality of potential connections between the at least one VPN server computer in a hub mode and the at east one VPN client computer in a client mode, the method comprising the steps of:

(a) initiating from said at least one VPN server computer in a hub mode a connection with said directory service; and (b) registering said at least one VPN server computer in a hub mode a connection with said directory service as available for said at least one VPN client computer in a client mode to dynamically communicate via the open protocol real-time messaging with said at least one VPN server computer in a hub mode through an external network.

18. The method for creating a flexible and secure network connection between two or more computers, as described in claim 17, further comprising the steps of:

(c) monitoring data for one or more of connection cost, point-to-point performance analysis, point-to-point reliability, packet importance, and overall connection load; and (d) analyzing said data for one or more of connection cost, point-to-point performance analysis, point-to-point reliability, packet importance, and overall connection load to determine an optimal routing of virtual network traffic across multiple network interfaces.

19. The method for creating a flexible and secure network connection between two or more computers, as described in claim 18, wherein the analyzing step to determine an optimal routing of virtual network traffic across multiple network interfaces is made for each data packet being transmitted.

20. The method for creating a flexible and secure network connection between two or more computers, as described in claim 18, further comprising the step of:

(e) posting to the directory service at least one of the data analyzed in step (d).

\* \* \* \* \*